Feb. 7, 1950     A. V. B. CANDLER     2,496,518
AUTOMATIC SHUTOFF VALVE

Filed Sept. 1, 1944     2 Sheets-Sheet 1

Inventor
A. V. B. CANDLER,
By B. P. McKinne
Attorney

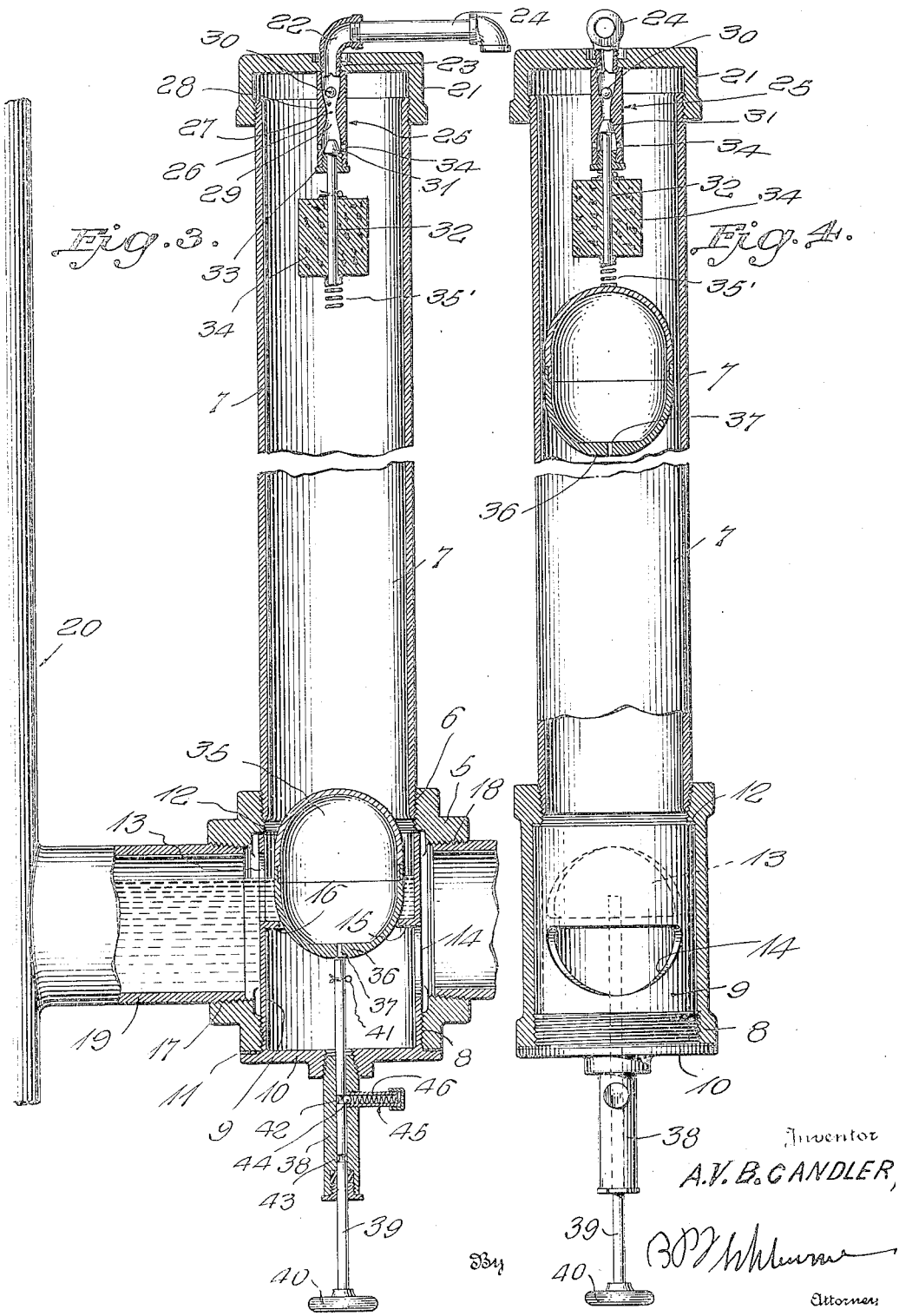

Patented Feb. 7, 1950

2,496,518

UNITED STATES PATENT OFFICE 2,496,518

AUTOMATIC SHUTOFF VALVE

Arthur V. B. Candler, Tulsa, Okla.

Application September 1, 1944, Serial No. 552,311

1 Claim. (Cl. 137—68)

My invention relates to automatic shut-off valves for pipe lines or the like.

In the majority of fields where oil is being produced, the oil storage tanks are at a considerable distance from the pumping station. The pipe-line system connecting the storage tank or tanks with the pump suction manifold may involve not only one line of considerable length but an extension of lines comprising a pipe-line gathering system of numerous branches. The entrance of air or gaseous fluids, such as oil vapors, into the suction line between the storage tank and pumping station, presents a difficulty to pumping operation, such as vapor locking of the pumping unit, or other adverse conditions, such as the tendency of accumulation of paraffin deposits in the gathering lines.

An important object of the invention is to provide a valve of the above mentioned character which will effect exclusion of air and gaseous fluids, such as oil vapors, from pipe lines, conveying oil, thereby eliminating the necessity of bleeding lines or other procedure as may be applied when vapor locks occur.

A further object of the invention is to provide the float valve with a vent opening whereby any accumulated liquid within the float valve will be removed by the suction action of the pumping unit, when it is operated to drain the tank.

A further object of the invention is to so shape and weight the float valve that auxiliary guide means may be dispensed with.

A further object of the invention is to provide a simple and reliable trip rod for unseating the float valve when held seated by the static column.

Figure 1:
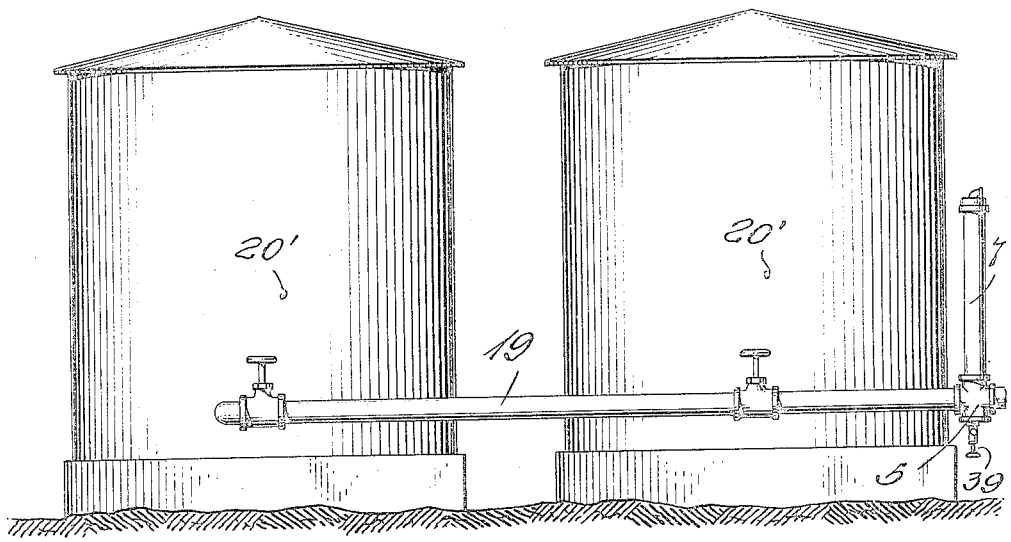
Figure 2:
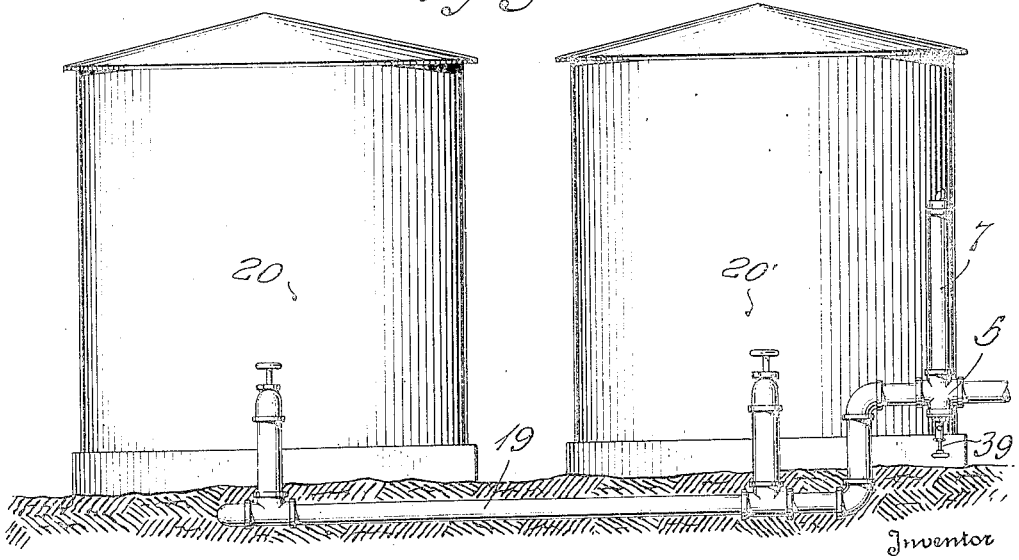

In accompanying drawings forming a part of this application and in which like numerals are employed to designate like parts throughout the same, Figure 1 is a side elevation of an automatic shut-off valve embodying my invention, showing the same applied to a header or pipe-line connected with a plurality of tanks, Figure 2 is a similar view showing the pipe line or header beneath the ground, Figure 3 is a central vertical longitudinal section through the shut-off valve, showing the same connected with one storage tank, and Figure 4 is a similar view taken at 90° to Figure 3.

In the drawings, wherein for the purpose of illustration is shown a preferred embodiment of my invention, the numeral 5 designates the valve casing, having an upper screw-threaded opening 6 to receive the lower screw threaded end of a vertical cylindrical pipe or float chamber 7. At its lower end the casing 5 has a screw threaded opening 8 for engagement with the screw threaded lower portion of a cylindrical cage 9, having a head 10. Packing 11 is arranged between the head 10 and casing 5 and packing 12 is also arranged at the top of the cylindrical gage 9. The cylindrical gage has an upper inlet opening 13 and a lower outlet opening 14, and a horizontal web 15 is arranged between these openings and is provided with an opening 16, the wall of which constitutes a valve seat. The casing 5 has screw threaded openings 17 and 18, for receiving portions of a header or pipe line 19. In Figure 3 one end of the pipe line 19 leads to a vertical storage tank 20 while the opposite end may lead to the suction side of a pump at the pumping station.

At its top, the vertical pipe or float chamber 7 has a cap or head 21 applied thereto, preferably having screw threaded engagement therewith. An elbow 22 is screw threaded into an opening 23 arranged centrally within the cap 21 and this elbow is connected with a vent pipe 24. Arranged within the upper end of the pipe or float chamber 7 is a bleeder valve 25, including a tubular casing 26, having screw threaded engagement with the lower end of the elbow 23. This tubular casing has the intermediate portion of its bore contracted at 27, providing tapered valve seats 28 and 29, as shown. Arranged within the tubular casing 26 above the contracted portion 27 is a check ball valve 30, to engage with the upper tapered valve seat 28. A tapered valve element 31 operates within the lower portion of the tubular casing 27 to engage with the tapered valve seat 29 and the valve element 31 is carried by a rod 32, slidable within a head or gland 33, having screw threaded engagement with the lower end of the tubular casing 27. The tubular casing 27 has openings 34 arranged near and above the head or gland 33, as shown. The rod 32 has a float 34 fixedly secured thereto and the rod extends below this float and carries a compressible coil spring 35', to absorb shocks from the float valve.

The numeral 35 designates a hollow float valve, which is preferably formed of plastic material such as "Bakelite". This float valve is circular in horizontal cross section and is vertically elongated so that it is substantially spheroid or elliptical. The hollow float valve 35 has its lower end weighted and this is accomplished by forming the bottom portion 36 thickened. This thickened portion is provided with a central aperture 37. The head 10 has a vertical sleeve 38 rigidly secured thereto, centrally thereof. This vertical sleeve receives a reciprocatory trip rod 39 having a knob 40 at its lower end and a stop or cotter pin 41 near its upper end. The trip rod 39 has upper and lower annular grooves 42 and 43 to receive a latch ball 44. This latch ball is guided in a tube 45 attached to the sleeve 38 and is moved inwardly by a spring 46.

The operation of the shut-off valve is as follows:

The float valve 35 has the opening 37 at its bottom and is therefore hollow and air filled. The float valve floats at its predetermined submergence level in the fluid without impedance due to the degree of vacuum or vapor pressure in the pipe or float chamber 7. Insurance of closing is thereby provided when the fluid in the pipe or float chamber 6 reaches a predetermined low level. The vertical elongated shape of the hollow float valve and its wedged bottom 16 cause the float valve to be properly guided within the pipe or float chamber 7, thereby eliminating the use of auxiliary guide rods and associated elements. The float valve is slightly smaller in external diameter to the internal diameter of the pipe or float chamber 7 and is therefore guided by the pipe or float chamber but the oil may pass in the pipe 7 exterior of the float valve. The pipe or float chamber is of a height to provide a static head to hold the float valve in the closed position, when the pipe or float chamber is filled with oil or the like. The pipe or float chamber is installed near the tank or tanks. When there is no flow of oil in the line or header, the static head holds the float valve 35 firmly upon its seat 16, the pipe or float chamber being now filled with the oil if the level in the tank is sufficient, thereby providing the static head. When the level of the oil rises in the pipe or float chamber 7, the float 34 rises and valve element 31 engages the lower valve seat 29 and this will prevent the escape of the oil from the bleeder valve.

When starting to run or withdraw the oil from the tank, the pump being set into action, the float valve is held upon its seat 16 by the static column and a vacuum is created in the pipe line 19 and the casing 5 beneath the float valve 35 and this vacuum also serves to more firmly hold the float valve upon its seat.

In order to start withdrawing the oil from the tank 20, the trip rod 39 is raised until the lower groove 43 receives the latch ball 44. This upward movement of the trip rod unseats the float valve and moves it upwardly in the liquid column within the pipe or float chamber and this float valve will then rise within the liquid column and strike and move the spring 35 and shift rod 32, closing the valve element 31 and preventing the oil from passing through the bleeder valve. The float valve 35 is now at the top of the liquid column in the pipe or float chamber 7. When the withdrawal or run of the oil from the tank 10 is started, the trip rod 39 is moved downwardly to a lowered position so that its upper groove 42 receives the latch ball 44. As the oil is withdrawn from the tank 20 it passes through the openings 13 and 14 and the level of the oil within the tank 20 gradually lowers and the level of the oil in the pipe or float chamber 7 gradually lowers accordingly. The float valve 35 is now descending and approaching its seat 16. When the level of the fluid or oil in the tank 20 reaches the top of the pipe 19, the float valve will move down and engage the seat 16. The float valve is so weighted that it is completely seated when the fluid level is at the top of the pipe 19 or just below such top, as shown in Figure 3. When this condition exists, the float valve 35 is firmly seated, cutting off communication between the tank and the pipe 19 upon the discharge side of the casing 5, and the section of the gathering lines between the shut-off valve and pumping unit is bled free of air or excess fluids through means of the pump vacuum. When this action occurs the vacuum in the casing 5 beneath the hollow float valve 35 is transmitted to the interior of this float valve through the opening 37 and any oil or liquid contained within the hollow float valve 35 will be drained out of this hollow float valve. This is important. As is well known, "Bakelite" float valves are made in two halves, sealed together at the equator, and after a time in service, they become overweighted and rendered inoperative. I have found that this difficulty may be overcome by draining the liquid from the interior of the hollow float valve through the opening 37, as explained. The pipe or float chamber 7 being emptied of the oil or fluid, and the valve element 31 being unseated, any air or vapor which has accumulated in the tank may escape through the pipe 19 into the pipe or float chamber 7 and pass to the atmosphere through openings 34, tubular casing 26 and pipe 24, providing that this air or vapor is under pressure at least slightly above atmospheric pressure to unseat the ball check valve 30. This ball check valve is weighted so as to open a few ounces above atmospheric pressure.

In Figures 1 and 2, the header or pipe line 19 is connected with a plurality of tanks 20', and the pipe line 19 is arranged above ground. In Figure 2, the pipe line 19 is shown as arranged beneath the ground and is connected with the tanks 20', as shown.

It is to be understood that the form of my invention herein shown and described is to be taken as a preferred example of the same and that various changes in the shape, size, and arrangement of parts may be resorted to without departing from the spirit of my invention or the scope of the subjoined claim.

Having thus described my invention what I claim is:

An automatic shut-off valve for a pipe line extending between an oil tank and a suction pump, comprising a substantially vertical casing having an opening at its top and an opening at its bottom, the top and bottom openings being of smaller diameter than the interior of the casing, said casing having inlet and outlet openings in its side, a vertical cage held within the bottom opening of the casing and including a lower head and a horizontal web arranged within the casing near the longitudinal center of the casing, said web having a valve seat which has a smaller diameter than the internal diameter of the cage, the upper end of the cage terminating adjacent to the top opening of the casing, said cage being provided with an inlet opening above the web and an outlet opening beneath the web, a combined guide and stuffing box secured to the head and depending vertically below the head, a substantially vertical cylindrical float chamber having its lower end held within the top opening of the casing, the float chamber having a uniform bore extending through its lower end and such lower end terminating close to the top end of the cage, the diameter of the bore of the float chamber being less than the internal diameter of the cage, a hollow float valve element to be arranged within the casing and having upper and lower tapered ends, the valve element being formed of stiff plastic material and having its bottom thickened and weighted, said bottom having a reduced drain opening, the float valve element being arranged above the horizontal web for movement upwardly into the float chamber, said valve element having an exterior diameter only slightly less than the interior diameter of the float chamber, the inner wall of the float chamber being free from guide means and serving to directly accurately guide the float valve element when it rises into the same, the thickened weighted bottom of the float valve element serving to maintain the same in an upright position when traveling in the float chamber, the float valve element when seated being spaced at its side from the cage and at its top from the float valve chamber so that it can freely seat, and a vertical rod mounted within the combined guide and stuffing box and projecting above the head and adapted to be moved upwardly to contact with the thickened weighted bottom of the float valve element to unseat the same.

ARTHUR V. B. CANDLER.

REFERENCES CITED

The following references are of record in the file of this patent:

UNITED STATES PATENTS

| Number | Name | Date |
| --- | --- | --- |
| 674,004 | Hess | May 14, 1901 |
| 803,355 | McMullen | Oct. 31, 1905 |
| 975,153 | O'Neill | Nov. 8, 1910 |
| 1,383,273 | Klahn | June 28, 1921 |
| 1,542,036 | Conrader | June 16, 1925 |
| 2,103,057 | Blumer | Dec. 21, 1937 |
| 2,210,751 | Cronkhite | Aug. 6, 1940 |
| 2,251,357 | Harroun | Aug. 5, 1941 |
| 2,252,164 | Cantor | Aug. 12, 1941 |
| 2,306,621 | Giansetto | Dec. 29, 1942 |